United States Patent [19]

Langendorf et al.

[11] Patent Number: 5,114,288
[45] Date of Patent: May 19, 1992

[54] ROAD TRANSPORT VEHICLE

[75] Inventors: Heinrich Langendorf, Bahnhofstrasse; Reinhard Olfers, Castroper Strasse, both of Fed. Rep. of Germany

[73] Assignee: Fahrzeugbau Langendorf GmbH & Co. KG, Fed. Rep. of Germany

[21] Appl. No.: 609,818

[22] Filed: Nov. 6, 1990

[51] Int. Cl.$^5$ .............................................. B60P 7/10
[52] U.S. Cl. ..................................... 410/34; 410/32; 410/118
[58] Field of Search .................. 410/117, 118, 31, 32, 410/33, 34, 35

[56] References Cited

U.S. PATENT DOCUMENTS

| 4,527,826 | 7/1985 | O'Neal | 410/34 X |
| 4,626,017 | 12/1986 | Robertson | 410/32 X |
| 4,688,976 | 8/1987 | Rowley et al. | 410/32 X |

FOREIGN PATENT DOCUMENTS

| 3022374 | 12/1981 | Fed. Rep. of Germany | 410/32 |
| 3516914 | 11/1986 | Fed. Rep. of Germany | 410/32 |
| 2619769 | 3/1989 | France | 410/32 |

Primary Examiner—David A. Bucci
Assistant Examiner—Craig Slavin
Attorney, Agent, or Firm—Remy J. VanOphem

[57] ABSTRACT

Road transport vehicle for securing and transporting large plates of glass. The road transport vehicle transports the plates, such as glass, in a large load space located between the rear axles of the vehicle. The road transport vehicle supports the plates such that they are inclined against a pair of interior brace walls and supported from beneath by a frame. The plates are secured with a pair of transport braces which are hydraulically actuated through a parallel crank gear which maintains the transport braces in a parallel relation to the plates throughout the full range of the transport braces, regardless of the aggregate thickness of the plates. The securing force imparted by the transport braces is in a generally downward direction and toward the inclined plane of the plates so as to accommodate various sizes and thicknesses of plates. A buffer is employed to avoid damage to the plates by better distributing the securing force. Flexibility of the buffer is limited to the direction normal to the plates to promote reliable immobilization of the plates.

10 Claims, 5 Drawing Sheets

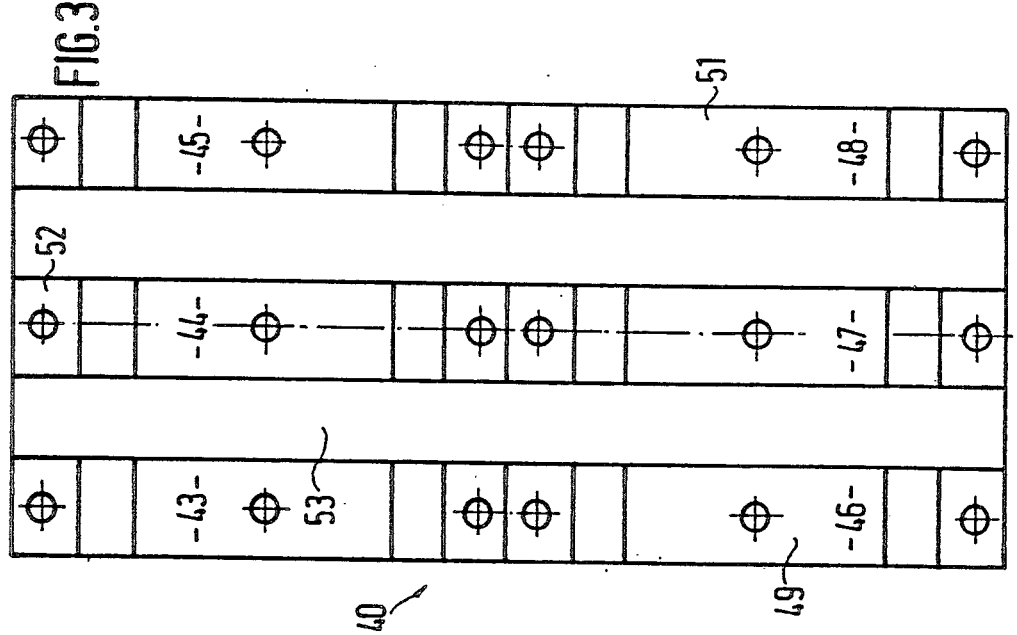

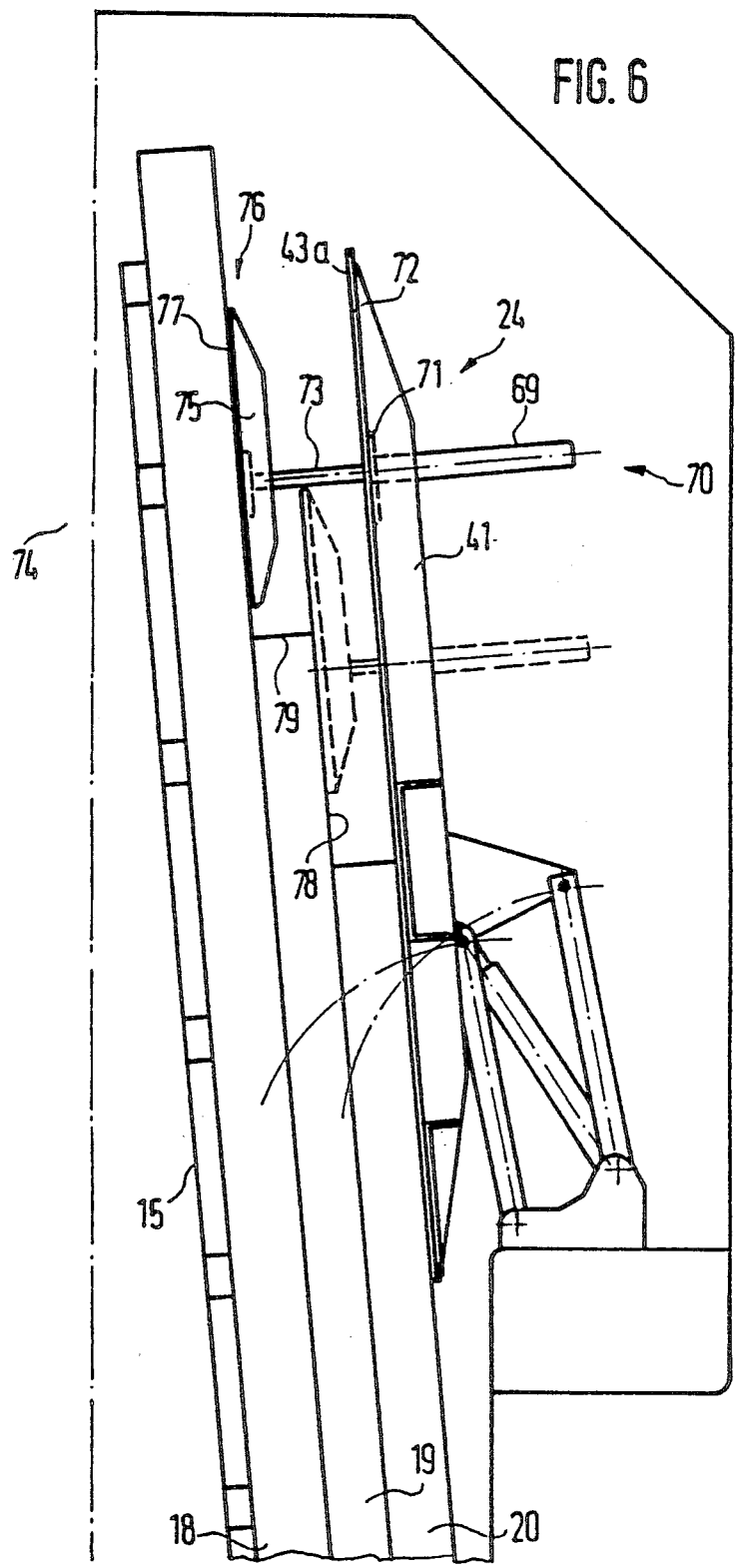

ROAD TRANSPORT VEHICLE

BACKGROUND OF THE INVENTION

1. Field of the Invention

This invention pertains to a road transport vehicle and in particular a road transport vehicle for transporting upright glass plates or glass packets.

2. Description of the Prior Art

A known road transport vehicle is disclosed in DE PS 35 16 914. Each securing device therein consists of a frame structure whose horizontal frame elements run practically over the entire length of the load space. However, the perpendicular frame elements are comparatively short, because the parallel crank gears run the securing devices into the release position far upward into the load space. The horizontal frame elements from the understructure of the transport supports which have hollow profiles of elastic material which are set in the secured position on the outside of the glass plates. The parallel crank gears allocated to each securing device are mounted by their perpendicular base to the vehicle longitudinal support that encloses the load space.

Under these conditions there is a considerable reduction in the vehicle's payload due to the base supports of the gears. On the other hand, immobilizing the glass plates is unsatisfactory due to the limited contact surface of the flexible transport supports on the glass plates. Thus the glass plate packets can execute motions under the influence of transport stresses so that glass plates rub together causing scratching of the plate surface that may ruin the plates.

Another disadvantage arises from using different transport frames. More than one type of transport frame is commonly available for use during a long transition period. Since such transport supports are not able to adapt to a change in the angle of inclination of the glass attributable to using different types of transport frames, each time a different transport frame is encountered may result in an unreliable immobilization of the glass.

In the road transport vehicle disclosed in DE GM 87 17 269 the securing devices on each side of the load space are driven separately by individually powered transport braces with a drive allocated to each. Thus a relatively larger contact surface of the transport brace can be achieved in the secured position and the payload enlarged because the drive and the gearing are located transverse to the load space. The gear consists only of a rotating shaft mounted by a pivot joint to the thrust piston drive articulated with the vehicle longitudinal support. The transport brace's understructure is mounted to the rotating shaft; it supports a relatively flat and broad, elastic or elastomer lining in contact with the glass plates in the transport position.

Articulation of the transport braces means they will have to be mounted mostly in the perpendicular middle of the understructure to keep the transport braces at equilibrium during the motion in the two operating positions of the securing mechanism. But the transport frames are loaded with packets of differing perpendicular dimensions. For floating glass plates, these dimensions can go down to about 1.5 m and then only account for a fraction of half the height of the transport frame. Then the mount of the rotating shaft and thus the force attack point of the thrust piston gear moves over the upper edge of the glass plate pocket. In the transport position the transport braces then pivot inward and damage the upper edges of the glass.

The invention is a transport vehicle of the general design described wherein a reliable immobilization of the load is ensured and, in spite of differing dimensions of the load, damage to the load is not possible.

SUMMARY OF THE INVENTION

Road transport vehicles according to the invention are suitable for transporting large plates because the load space located between the divided rear axles of a vehicle usually designed as a semi-trailer, has an increased height compared to standard road transporters used for the load and the transport frame can hold the large plates securely in a slanted position. Although large plates can be made of other materials, e.g. steel reinforced concrete, the invention is directed to the transport of large-format glass plates produced primarily at floating glass facilities.

The road transport vehicle according to the invention permits the use of a simplified design of the transport frame provided in large numbers in glass smelting, because the securing devices mounted to the vehicle eliminate the need for transport cushioning that has to be attached to the transport frame itself. The vehicle-mounted securing devices are usually moved and locked by hydraulic thrust piston gears driven by the vehicle's compressor. To supply the motion energy, a parallel crank gear allocated to each securing device is used with one of the four links being mounted to the frame. As is known, parallel crank drives are kinematically multi-joint chains where the opposing gear elements are of equal length and lie in parallel, and the cranks rotate in the same direction and at the same angular velocity. This means that the transport supports in the secured and released position, and also along their entire amount of motion, are held in the slant position corresponding to the load and are moved parallel to each other.

Excess dynamic stresses on the load after placement of transport supports against the glass plates are prevented in this manner.

According to the invention, the use of a parallel crank gear provides a crank guide that holds each transport brace at a constant inclination over its entire range of motion. This is the precondition for having the mounting point of the understructure of the transport brace located at the output of the parallel crank gear without requiring the transport braces to remain in a continuous labile equilibrium state. The point of force application shifts downwardly as each transport brace moves inwardly according to the invention. Thus it is possible to transport glass plate packets of smaller vertical dimensions without damage to their upper edges, because the force of the transport brace drive acts directly on the surface of the glass plate packet. The required mounting of the understructure of the transport brace at the output of the parallel crank gear occurs at a bracket of the gear linkage and by insertion of a buffer, so that angular changes in the transport frame are compensated due to the limited flexibility of the buffer to pivot motions of the transport brace in the main plane of the drive oriented transverse to the load space. Thus the invented road transport vehicle can transport the transport frames of the old and new type without changes and without disadvantages.

The invention has the advantage that the new road transport vehicle can transport, without damage, different height loads and different transport frames without change to the securing devices. Now the transport braces can be provided with the usual elastomers or elastic linings, which have practically no flexibility in the longitudinal direction of the load space and thus prevent shifts of the load.

In the road transport vehicle of the prior art described above the transport frame is often not exactly aligned with the middle of the load space. As a rule this means that the securing devices in the transport position place unequal forces on the sides of the transport frame and the load. In extreme cases this can cause glass breakage, but will always cause some uncertainty as to the stability of the load and the transport frame. According to the invention, this type of misalignment of the transport frame in the load space can be compensated for by use of parallel crank gears which guide transport braces connected to the brackets of the gear linkages well into the load space.

It is useful to eliminate any possible movement of the transport braces in the longitudinal direction of the load space. According to the invention, the transport braces can be tensioned with a certain pressure during transport and support the transport frame and its load. This means that the unavoidable movement tolerances in the pivot of the gearing are compensated, and promotes a reliable immobilization of the transport frame.

According to a further feature of the invention, the flexibility of the buffer is limited through multiple usage of shaped elements in the perpendicular and horizontal directions.

Another object of the invention is to provide a useful design of the buffer wherein practically all possible motions in the brace plane of the buffer are eliminated through appropriate selection of profile web width and profile web length, so that only perpendicular flexibility remains.

A further object of the invention is to permit simultaneous transport of large plates with differing perpendicular dimensions.

The details, other properties and advantages of the invention will be more apparent from the following description taken in conjunction with the accompanying drawings.

BRIEF DESCRIPTION OF THE DRAWINGS

FIG. 3 is a view of a buffer device according to the invention in the direction of arrow III of FIG. 1;

FIG. 4 is a side view of the buffer device of FIG. 3;

FIG. 5 is an enlarged view of the detail indicated by arrow V in FIG. 4;

FIG. 6 illustrates an alternate embodiment of the invention corresponding essentially to FIG. 1.

DETAILED DESCRIPTION OF THE PREFERRED EMBODIMENT

Figure 7:
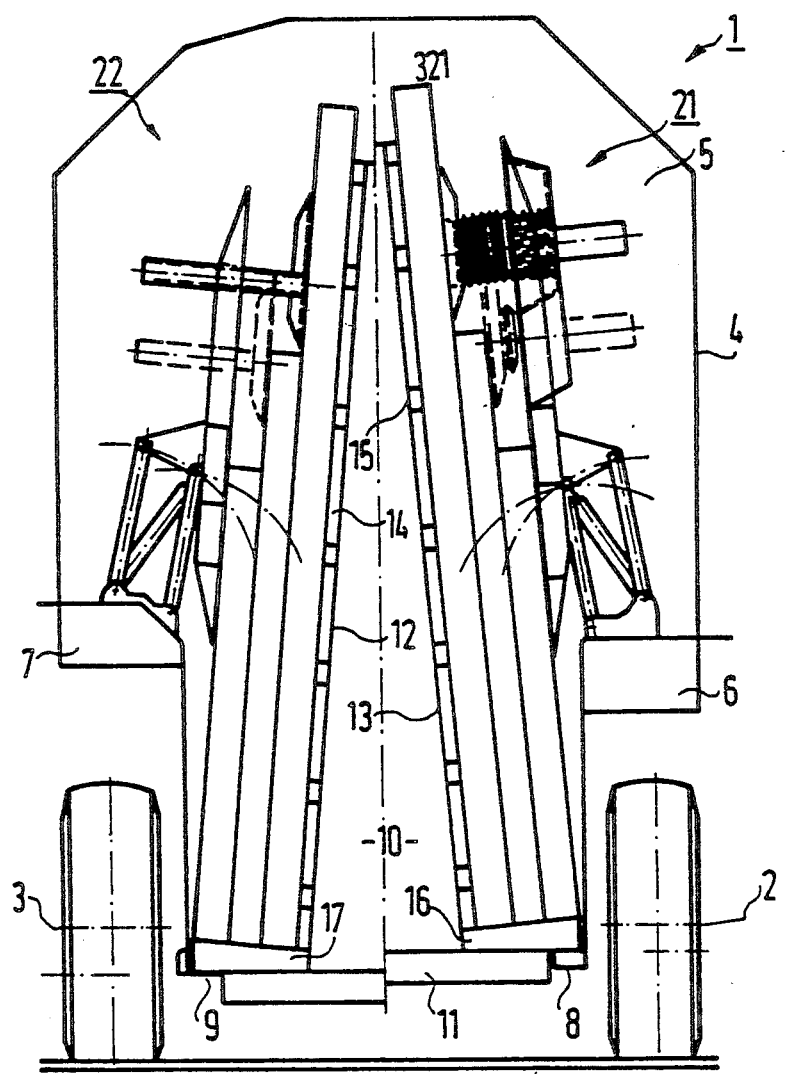
FIG. 7 is a view of a road transport vehicle according to the invention, shown in cross section in different transport modes.

As illustrated in FIG. 7, a new road transport vehicle 1 is designed as a semi-trailer. The semi-trailer has divided rear axles indicated at 2 and 3. The load space 5 of the vehicle is covered with a tarp 4 and extends under the rear axles 2 and 3 and is bound therebelow by strips 8 and 9 running in the longitudinal direction of the chassis carrier 6 and 7. A transport frame 10 with its understructure 11 rests on these strips. The cross section of the transport frame is generally A-shaped and thus has inward sloped brace walls 12 and 13 that consist, in part, of a frame structure in which perpendicular frame elements 14 with horizontal frame elements 15 are joined into a stiff structure. The leaning load rests on foot braces 16 and 17 of the transport frame 10.

As shown in FIG. 6, the load consists of large plates that are combined into packets, 18 through 20 in the illustrated example, which deal with glass plates. The packets 18 through 20 contain several glass disks of equal dimensions and are braced against each other and against the walls of the transport frame 10 so that they stand upright.

As shown in FIG. 7, the transport vehicle is provided with one or more safety devices 21 and 22 at each side of its load space 5. The two safety devices 21 and 22 are identical; thus, only the details of one will be described.

Figure 1:
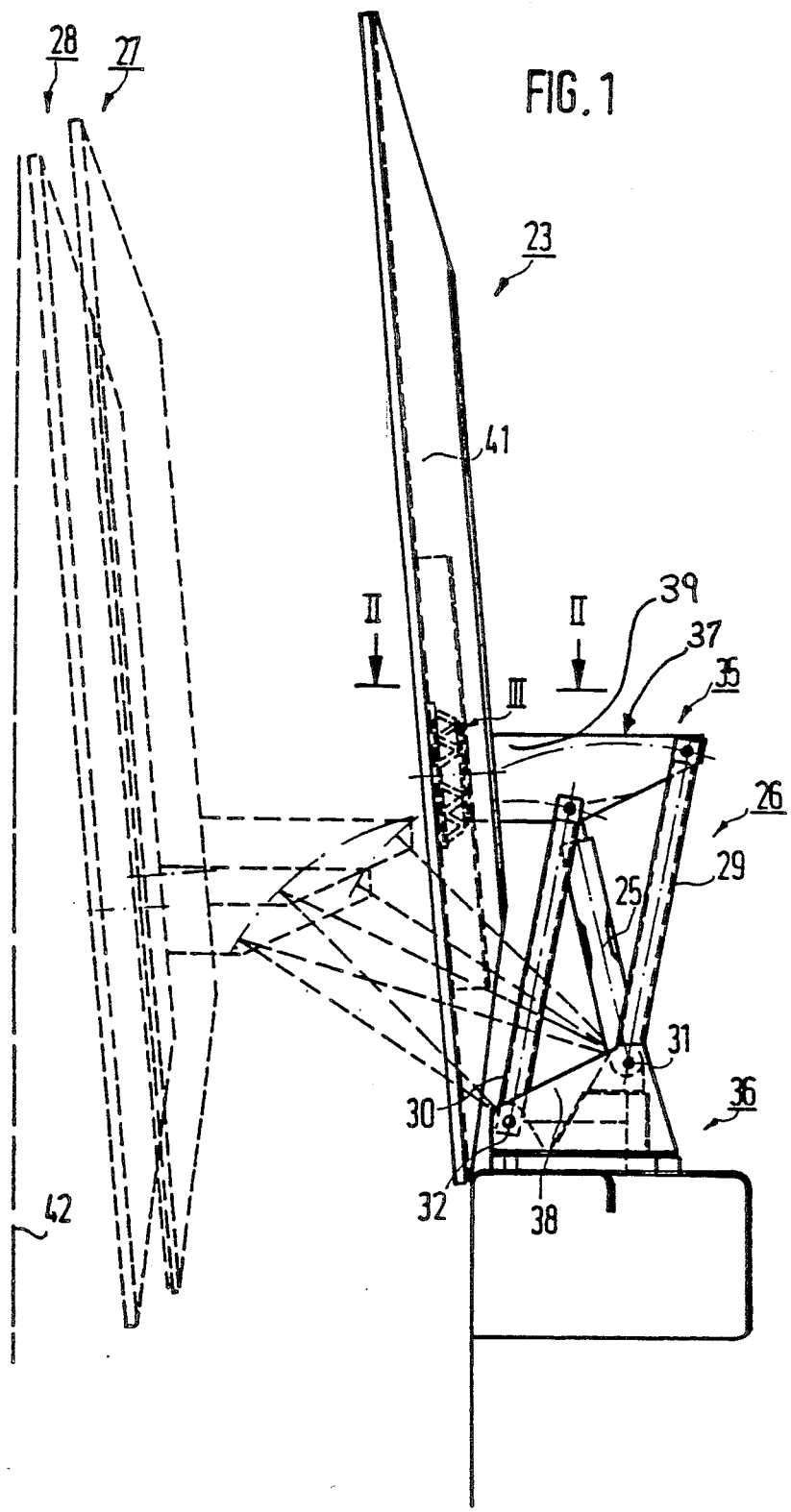
FIG. 1 is a partial cut-away view through the load space of the road transport vehicle according to the invention illustrating transport braces.

Each of the two safety devices 21 and 22 is allocated to individually driven transport braces which are identified in FIG. 1 as 23 and in FIG. 6 as 24. The transport braces are of the same design; thus, their details will be explained with reference to only one transport brace.

Each transport brace is allocated to a drive in the form of a thrust piston drive 25 and a guide drive unit generally denoted as 26. By using this drive, the transport braces can be placed in a release position indicted by the solid lines in FIG. 1 where the transport brace releases the load space 5. However, it can also be set to the locked position as shown by the solid line in FIG. 6 where the transport brace 24 touches the load 18 through 20 of the transport frame 10 on the outside. As shown in FIG. 1, due to the use of the guide drive unit 26, the transport braces 23 and 24 are held parallel to each other along their entire amount of motion. The position 27 indicated in FIG. 1 by a dashed line shows the location of the transport braces at the unloaded transport frame 10 whereas the position 28 shown by dashed line indicates the transport brace in its final position.

Figure 2:
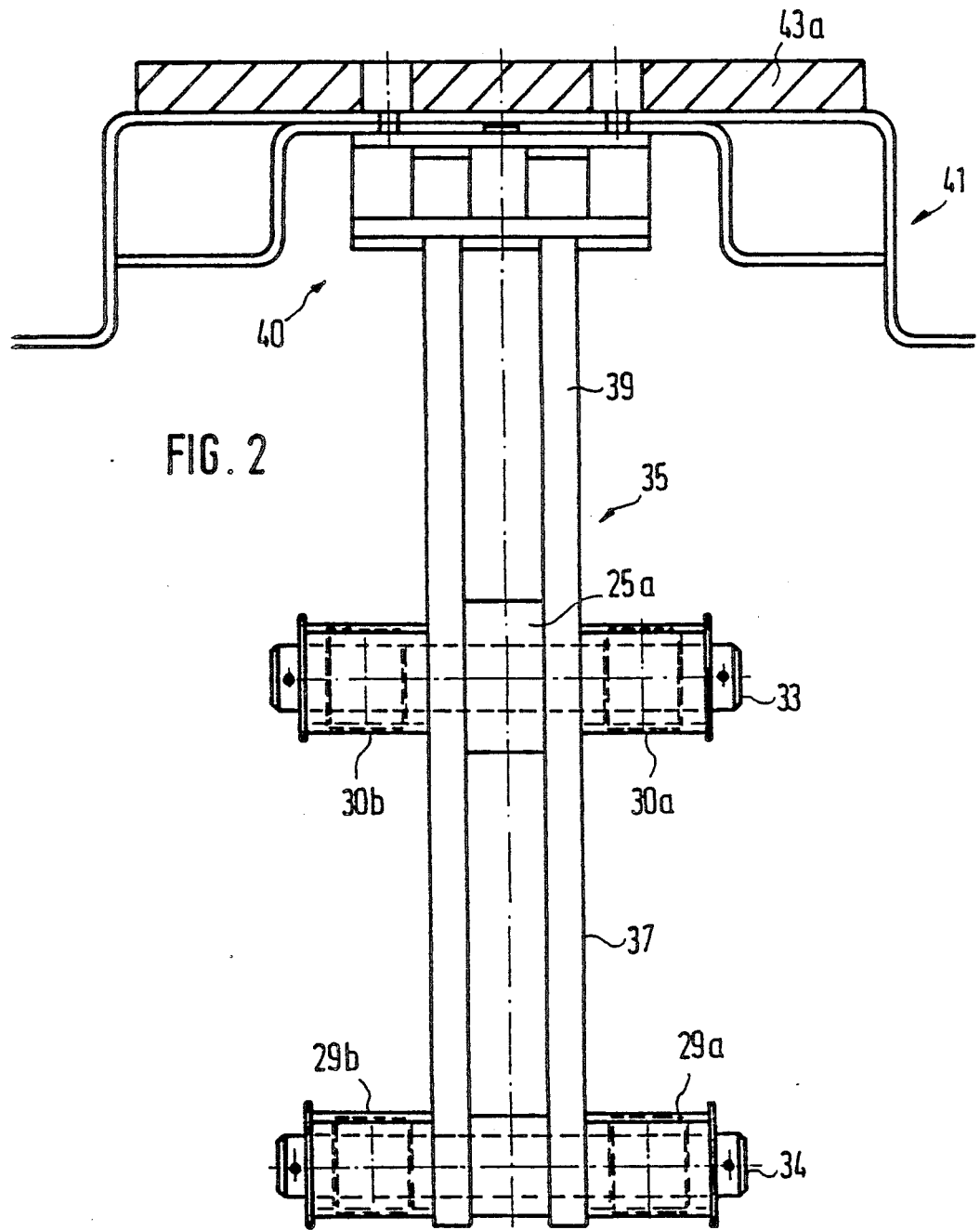
FIG. 2 is a cross-sectional view taken along line II—II of FIG. 1.

The guide drive unit 26 of the transport braces 23 and 24 is a parallel crank drive. As shown, two parallel cranks 29 and 30 are the same length and form a multi-joint chain with consoles 35 and 36 establishing predetermined distances between their pivot mounts 31 through 34. A trapezoidal part 37 of the console 35 forms a drive link 37, while the equal length and parallel part 38 of the console 36 forms a base 38 of the kinematic chain (FIG. 1). The console 35 is forked as shown in FIG. 2. The bolt of the pivot mount or joint 33 extends outside the fork prongs of parallel guides 30a, 30b which together form the crank 30. The eyelet head of a piston rod 25a of the thrust piston drive or cylinder 25 is pivotably secured by the pivot bolt 33 between the fork prongs of the console 35. The crank 29 is also formed by two guides 29a and 29b seated outside the fork on the bolt of the pivot mount 34. This ensures a central force division in a buffer 40.

The base of the drive and thus the main plane of the parallel crank drive 26 is oriented transverse to the load space 5. The drive linkage 37 has a bracket 39 on the load side. It is mounted to the understructure 41 (FIG. 1) with limited flexibility and with the buffer 40 (FIG. 3) in between. As shown in FIGS. 1 and 6, the buffer in all designs sits outside the middle of the transport brace and is offset downward with respect to it.

The dashed lines between the various positions of the transport braces 23 and 24 indicate radii of the motion curve of the pivot mounts 33 and 34 of the parallel cranks 29 and 30. As shown, the transport brace and its console 35 move parallel from the release position shown by solid lines into the transport positions 27 and 28 shown by dashed or dotted lines. Since the positions 27 and 28 extend beyond the load into the interior, misalignments of the transport frame from the middle of the load space, indicated as 42 in FIG. 1, can be compensated.

The understructure 41 of the transport braces 23 and 24 consists of rigid sheet metal and supports a comparatively thin plate 43a of rubber or elastic material, which allows paractically no longitudinal and transverse motion of the transport material in the transport position of the brace.

The structure of the buffer is visible especially from FIGS. 3 to 5 and allows a flexibility of the buffer that eliminates all motion in the plane of the transport brace. The buffer is built up from several shaped elements 43 through 48. The shaped elements 43, 46; 44, 47; and 45, 48 are placed in perpendicular rows. Rows 49, 52 and 51 are arranged in equal horizontal intervals 53 side by side.

Each shaped element of the buffer has an outer flange 54 that is shorter than an inner flange 55. The two flanges are supported by roof-like, sloped profile webs 56 through 59. These webs simultaneously divide a cavity into subcavities 60 through 62 that are open in a horizontal direction, i.e. transverse to the row 49, 52, and 51. The extensions of the inner flange 55 are provided with drilled holes 63 and 64 while the shorter outer flange 54 has a hole 65 in the middle. The holes hold mounting screws that are not shown in the figures. The connecting screws of the bracket 39 sit in the holes 65 while the understructure 41 is screwed to a plate 66 provided with conical surfaces 67 and 68 to hold the screw heads protruding through the drilled holes 63 and 64.

While the design of FIG. 1 allows a thorough support of the load via the braces 23, the design of FIGS. 6 and 7 differs. Here, a working cylinder 69 of a hydraulic or pneumatic thrust piston transmission 70 sits on the understructure 41 of the brace 24. A solid plate 71 on the cylinder 69 is used for mounting; the plate is attached by screws to a carrier plate 72 of the understructure that supports the thin plate or lining 43a. The plate 71 has an adjustable height and can thus be locked together with the thrust piston transmission 70 in various positions. The various positions of the thrust piston transmission 70 are shown as solid and dashed lines in FIGS. 6 and 7.

A piston rod 73 of the cylinder 69 also sits with a plate 74 on an understructure 75 of a support plate 76 that is provided with an elastic or elastomer lining 77 similar to the transport brace 24 that corresponds to the lining 43a. As shown in FIG. 6, the mounting or support plate 74 is eccentric, i.e. offset downward from the middle of the support plate 76 at the understructure 75. This causes the point of force application of the thrust piston transmission 70 to rest on the surface 78 of the glass packet 19 of when the majority of the plate 76 comes to rest above the upper edge 79 of the glass packet 19 due to the reduced vertical dimensions of the glass packet 19. This prevents damage to the upper edges of the glass plates within the glass packet.

We claim:

1. A road transport vehicle comprising:
   an interior load space;
   a transport frame disposed substantially upright within said interior load space, said transport frame having a pair of oppositely disposed inwardly sloping surfaces, each of said pair of inwardly sloping surfaces being adapted for receiving a load;
   a pair of securing devices located on opposite sides of said transport frame, each of said pair of securing devices being pivotally mounted to said road transport vehicle;
   a linkage pivotally attached to each of said pair of securing devices;
   a buffer mounted to each said linkage, said buffer facing said load space;
   a transport brace attached to each said buffer such that a larger portion of said transport brace extends upwardly from said buffer than extends downwardly from said buffer, each of said transport braces being positioned so as to be parallel to a corresponding adjacent one of said pair of inwardly sloping surfaces; and
   cranking means for rotating each of said pair of securing devices between a secure position where each of said transport braces abuts said load received upon said corresponding adjacent one of said inwardly sloping surfaces of said transport frame and a release position where each of said transport braces is retracted from said load space, said cranking means rotating said pair of securing devices such that each of said transport braces remains parallel to said corresponding adjacent one of said pair of inwardly sloping surfaces.

2. The road transport vehicle of claim 1, wherein said transport braces can be rotated by said cranking means beyond said secure position so as to abut said transport frame.

3. The road transport vehicle of claim 1, wherein said buffer has limited flexibility in a direction defined by a longitudinal axis of said linkage.

4. The road transport vehicle of claim 1 wherein said buffer consists of comprises a plurality of shaped elements of an elastic material positioned in adjacent rows.

5. The road transport vehicle of claim 4, wherein each of said plurality of shaped elements comprises:
   parallel flanges;
   a hollow cavity defined between said transport braces and said parallel flanges; and
   V-shaped webs attached to and supporting said parallel flanges, said V-shaped webs subdividing said hollow cavity into sub-cavities.

6. The road transport vehicle of claim 1, further comprising support means mounted to said larger portion of at least one of said transport braces, said support means comprising a support plate and actuation means.

7. The road transport vehicle of claim 6, wherein said support plate is mounted eccentrically in relation to said actuation means such that a larger portion of said support plate extends downwardly from said actuation means than extends upwardly therefrom.

8. The road transport vehicle of claim 6, wherein said support means is upwardly and downwardly adjustable on said at least one of said transport braces.

9. The road transport vehicle of claim 6, wherein said actuation means is a thrust piston gear, said thrust piston gear having an actuating cylinder mounted to said at least one of said transport braces.

10. The road transport vehicle of claim 9, wherein said support means further comprises an elastic or elastomer coating disposed on said support plate.

* * * * *

UNITED STATES PATENT AND TRADEMARK OFFICE
CERTIFICATE OF CORRECTION

PATENT NO. : 5,114,288

DATED : May 19, 1992

INVENTOR(S) : Langendorf et al

It is certified that error appears in the above-identified patent and that said Letters Patent is hereby corrected as shown below:

Column 1, line 18, delete "から" and insert ---- form ----.

Column 1, line 64, delete "pocket" and insert ---- packet ----.

Column 4, line 49, delete "37".

Column 4, line 51, delete "38".

Column 5, line 17, delete "paractically" and insert ---- practically ----.

Column 5, line 63, delete "of" first occurrence.

Column 6, line 41, delete "consists of".

Signed and Sealed this

Seventh Day of September, 1993

Attest:

BRUCE LEHMAN

*Attesting Officer*   *Commissioner of Patents and Trademarks*